(12) United States Patent
Kim et al.

(10) Patent No.: US 9,311,052 B2
(45) Date of Patent: Apr. 12, 2016

(54) METHOD OF PERFORMING MULTIPLICATION OPERATION IN BINARY EXTENSION FINITE FIELD

(71) Applicant: ELECTRONICS AND TELECOMMUNICATIONS RESEARCH INSTITUTE, Daejeon (KR)

(72) Inventors: Dongsoo Kim, Guri-si (KR); Junyoung Son, Daegu (KR); Sangwoon Yang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 283 days.

(21) Appl. No.: 14/084,767

(22) Filed: Nov. 20, 2013

(65) Prior Publication Data

US 2014/0149479 A1    May 29, 2014

(30) Foreign Application Priority Data

Nov. 29, 2012  (KR) .................. 10-2012-0137290
Jul. 23, 2013   (KR) .................. 10-2013-0086945

(51) Int. Cl.
*G06F 7/00*    (2006.01)
*G06F 7/72*    (2006.01)
*G06F 7/523*   (2006.01)

(52) U.S. Cl.
CPC ............... *G06F 7/724* (2013.01); *G06F 7/523* (2013.01)

(58) Field of Classification Search
CPC ................................ G06F 7/724; G06F 7/523
USPC ............................................. 708/491–492
See application file for complete search history.

(56) References Cited

U.S. PATENT DOCUMENTS 4,587,627 A * 5/1986 Omura .................. H03M 13/15
                                                     708/492
4,697,248 A * 9/1987 Shirota .................... G06F 7/724
                                                     708/492

(Continued)

FOREIGN PATENT DOCUMENTS

KR  10-2001-0068349 A   7/2001
KR  10-2009-0002899 A   1/2009

OTHER PUBLICATIONS

Murat Cenk et al., "Polynomial Multiplication over Finite Fields using Field Extensions and Interpolation," 19th IEEE International Symposium on Computer Arithmetic, 2009.

(Continued)

*Primary Examiner* — Tan V. Mai
(74) *Attorney, Agent, or Firm* — LRK Patent Law Firm (57) ABSTRACT

In a method of performing a multiplication operation in a binary extension finite field, a polynomial defined by

$$\sum_{n=0}^{W-1} C_n \cdot z^n$$

is produced by expanding polynomial basis multiplication for multiplication of two polynomials a(z) and b(z) in a binary extension finite field. A mapping table is generated in which bit values having pieces of information about respective terms of the produced polynomial are mapped to respective rows. A code for calculating the polynomial, produced by expanding the polynomial basis multiplication for the multiplication of the two polynomials, with reference to the mapping table is generated. A multiplication operation of the two polynomials a(z) and b(z) in the binary extension finite field is performed by executing the code for calculating the polynomial wherein $$a(z) = \sum_{n=0}^{m-1} a_n \cdot z^n, \; b(z) = \sum_{n=0}^{m-1} b_n \cdot z^n,$$

and W denotes a number of bits of a word that is an operation processing unit of a processor.

5 Claims, 3 Drawing Sheets

(56) References Cited

U.S. PATENT DOCUMENTS

| | | | | |
|---|---|---|---|---|
| 4,797,848 | A | * | 1/1989 | Walby ................... H03M 13/15 708/491 |
| 5,999,959 | A | * | 12/1999 | Weng ...................... G06F 7/724 708/492 |
| 6,389,442 | B1 | | 5/2002 | Yin et al. |
| 8,099,655 | B1 | | 1/2012 | Tan et al. |
| 2003/0105791 | A1 | | 6/2003 | Stein et al. |

OTHER PUBLICATIONS

Peng Ning et al., "Efficient Software Implementation for Finite Field Multiplication in Normal Basis," Lecture Notes in Computer Science, 2001.

\* cited by examiner

METHOD OF PERFORMING MULTIPLICATION OPERATION IN BINARY EXTENSION FINITE FIELD

CROSS REFERENCE TO RELATED APPLICATIONS

This application claims the benefit of Korean Patent Application Nos. 10-2012-0137290 filed on Nov. 29, 2012 and 10-2013-0086945 filed on Jul. 23, 2013, which are hereby incorporated by reference in their entireties into this application.

BACKGROUND OF THE INVENTION

1. Technical Field

The present invention relates generally to a method of performing a multiplication operation in a binary extension finite field and, more particularly, to a method that produces a polynomial by expanding polynomial basis multiplication for the multiplication of two polynomials in a binary extension finite field $GF(2^m)$ and performs a multiplication operation in a binary extension finite field using a mapping table in which bit values having pieces of information about respective terms of the produced polynomial are mapped to respective rows.

2. Description of the Related Art

An Elliptic Curve Cryptosystem (ECC) was proposed by Neal Kobliz and Victor Millerin in 1985 and since then, a lot of research into ECC has been conducted as a public key cryptosystem. This cryptosystem is based on the difficulty of discrete logarithm of points on an elliptic curve, and is advantageous in that it is processed faster and has a smaller key than the Rivest-Shamir-Adleman (RSA) algorithm/Digital Signature Algorithm (DSA) which are widely utilized as a conventional public key cryptosystem when a comparison is performed at the same security level. For example, it is well known that the security of ECC having a key size of about 160 bits is identical to that of RSA having a key size of 1024 bits. Therefore, ECC has attracted attention as a public key cryptosystem suitable for smart cards or the like having limited computing ability and memory.

Operations in such ECC include operations of points on an elliptic curve, which include the addition of two different points, a one-point doubling operation, etc. Such operations of points on the elliptic curve include combinations of finite field addition, finite field subtraction, finite field multiplication, finite field division, etc.

A finite field denotes a field having a finite number of elements for which addition, subtraction, multiplication, and division are defined, and has only one field having $p^m$ elements with respect to a prime number p and a positive integer m. This field is called a Galois field and is represented by $GF(p^m)$. Generally, operations, such as addition, subtraction, multiplication, and division, in a finite field are implemented using hardware and are then calculated. When addition and subtraction operations in the finite field $GF(p^m)$ are performed using hardware, the implementation of the operations is simplified. However, there is a problem in that the implementation of multiplication and division operations using hardware is complicated. In order to implement fast elliptic curve cryptography, it is essential that finite field multiplication, in particular, is processed at high speed. A multiplier for performing multiplication in the finite field $GF(p^m)$ implemented using hardware is disclosed in Korean Patent Application Publication No. 2001-0068349 or the like.

A conventional finite field $GF(p^m)$ multiplication algorithm disclosed in Korean Patent Application Publication No. 2001-0068349 or the like is generally implemented using an algorithm represented in the following Table 1.

TABLE 1

| Conventional algorithm method for polynomial multiplication |
|---|
| INPUT: Binary polynomials a(z) and b(z) of degree at most m−1<br>OUTPUT: c(z) = a(z) · b(z)<br>1. C ← 0<br>2. For k from 1 to W−1 do<br>   2.1 For j from 0 to t−1<br>      If the kth bit of A[j] is 1 then C{j} ← C{j}+B<br>   2.2 If k ≠ W−1 then B ← B·z<br>3. Return (C) |

SUMMARY OF THE INVENTION

Accordingly, the present invention has been made keeping in mind the above problems occurring in the prior art, and an object of the present invention is to provide a technique capable of performing a multiplication operation optimized for the structure of a processor for performing a multiplication operation in a binary extension finite field $GF(2^m)$, regardless of the structure of the corresponding processor, when a multiplication operation in a binary extension finite field $GF(2^m)$ is implemented as a software library rather than hardware.

In accordance with an aspect of the present invention to accomplish the above object, there is provided a method of performing a multiplication operation in a binary extension finite field, including producing a polynomial defined by $$\sum_{n=0}^{W-1} C_n \cdot z^n$$

by expanding polynomial basis multiplication for multiplication of two polynomials a(z) and b(z) in a binary extension finite field $GF(2^m)$; generating a mapping table in which bit values having pieces of information about respective terms of the produced polynomial are mapped to respective rows; generating a code for calculating the polynomial, produced by expanding the polynomial basis multiplication for the multiplication of the two polynomials a(z) and b(z), with reference to the mapping table; and performing a multiplication operation of the two polynomials a(z) and b(z) in the binary extension finite field by executing the code for calculating the polynomial wherein $$a(z) = \sum_{n=0}^{m-1} a_n \cdot z^n, \ b(z) = \sum_{n=0}^{m-1} b_n \cdot z^n,$$

and W denotes a number of bits of a word that is an operation processing unit of a processor for performing the multiplication operation in the binary extension finite field.

Preferably, producing the polynomial may be configured to produce a polynomial $$\sum_{n=0}^{W-1} C_n \cdot z^n = \left\{ \sum_{j=0}^{t-1} (a_{W \cdot j + W - 1})(b(z) \cdot z^{W \cdot j}) \right\} \cdot z^{W-1} +$$

-continued $$\left\{\sum_{j=0}^{t-1}(a_{W\cdot j+W-2})(b(z)\cdot z^{W\cdot j})\right\}\cdot z^{W-2}+$$

$$L+\left\{\sum_{j=0}^{t-1}(a_{W\cdot j+2})(b(z)\cdot z^{W\cdot j})\right\}\cdot z^2+$$

$$\left\{\sum_{j=0}^{t-1}(a_{W\cdot j+1})(b(z)\cdot z^{W\cdot j})\right\}\cdot z^1+\left\{\sum_{j=0}^{t-1}(a_{W\cdot j})(b(z)\cdot z^{W\cdot j})\right\}\cdot z^0$$

by expanding the polynomial basis multiplication given by the following equation $$a(z)\cdot b(z)=\left\{\sum_{j=0}^{t-1}(a_{W\cdot j+W-1})(b(z)\cdot z^{W\cdot j})\right\}\cdot z^{W-1}+$$

$$\left\{\sum_{j=0}^{t-1}(a_{W\cdot j+W-2})(b(z)\cdot z^{W\cdot j})\right\}\cdot z^{W-2}+$$

$$L+\left\{\sum_{j=0}^{t-1}(a_{W\cdot j+2})(b(z)\cdot z^{W\cdot j})\right\}\cdot z^2+$$

$$\left\{\sum_{j=0}^{t-1}(a_{W\cdot j+1})(b(z)\cdot z^{W\cdot j})\right\}\cdot z^1+\left\{\sum_{j=0}^{t-1}(a_{W\cdot j})(b(z)\cdot z^{W\cdot j})\right\}\cdot z^0$$

for the multiplication of the two polynomials a(z) and b(z) wherein $$t=\left\lceil\frac{m}{W}\right\rceil,$$

and [x] denotes an operation for outputting a minimum integer equal to or greater than x.

Preferably, generating the mapping table may be configured to generate a mapping table in which bit values having pieces of information about respective terms $$\left\{\sum_{j=0}^{t-1}(a_{W\cdot j+W-1})(b(z)\cdot z^{W\cdot j})\right\},$$

$$\left\{\sum_{j=0}^{t-1}(a_{W\cdot j+W-2})(b(z)\cdot z^{W\cdot j})\right\},$$

... , $$\left\{\sum_{j=0}^{t-1}(a_{W\cdot j+1})(b(z)\cdot z^{W\cdot j})\right\},$$

$$\left\{\sum_{j=0}^{t-1}(a_{W\cdot j+1})(b(z)\cdot z^{W\cdot j})\right\},$$

and $$\left\{\sum_{j=0}^{t-1}(a_{W\cdot j})(b(z)\cdot z^{W\cdot j})\right\}$$

in the polynomial are mapped to respective rows.

Preferably, generating the mapping table may be configured to map the bit values having the pieces of information about the respective terms $$\left\{\sum_{j=0}^{t-1}(a_{W\cdot j+W-1})(b(z)\cdot z^{W\cdot j})\right\},$$

$$\left\{\sum_{j=0}^{t-1}(a_{W\cdot j+W-2})(b(z)\cdot z^{W\cdot j})\right\},$$

... , $$\left\{\sum_{j=0}^{t-1}(a_{W\cdot j+2})(b(z)\cdot z^{W\cdot j})\right\},$$

$$\left\{\sum_{j=0}^{t-1}(a_{W\cdot j+1})(b(z)\cdot z^{W\cdot j})\right\},$$

and $$\left\{\sum_{j=0}^{t-1}(a_{W\cdot j})(b(z)\cdot z^{W\cdot j})\right\}$$

in the polynomial to respective rows of a mapping table having $2^t$ rows.

Preferably, generating the mapping table may be configured to, if a value of t is greater than a preset integer r, map the bit values having the pieces of information about the respective terms $$\left\{\sum_{j=0}^{t-1}(a_{W\cdot j+W-1})(b(z)\cdot z^{W\cdot j})\right\},$$

$$\left\{\sum_{j=0}^{t-1}(a_{W\cdot j+W-2})(b(z)\cdot z^{W\cdot j})\right\},$$

... , $$\left\{\sum_{j=0}^{t-1}(a_{W\cdot j+2})(b(z)\cdot z^{W\cdot j})\right\},$$

$$\left\{\sum_{j=0}^{t-1}(a_{W\cdot j+1})(b(z)\cdot z^{W\cdot j})\right\},$$

and $$\left\{\sum_{j=0}^{t-1}(a_{W\cdot j})(b(z)\cdot z^{W\cdot j})\right\}$$

in the polynomial to respective rows of a plurality of mapping tables, each having $2^t$ or less rows.

Preferably, the preset integer r may be 8.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings. In the following description, redundant descriptions and detailed descriptions of known functions and elements that may unnecessarily make the gist of the present invention obscure will be omitted. Embodiments of the present invention are provided to fully describe the present invention to those having ordinary knowledge in the art to which the present invention pertains. Accordingly, in the drawings, the shapes and sizes of elements may be exaggerated for the sake of clearer description.

A method of performing a multiplication operation in a binary extension finite field according to the present invention may enable a computer having a 2n-bit processor to effectively calculate a reciprocal number by utilizing a new algorithm for obtaining a reciprocal number in a finite field. A finite field has been applied as elemental technology for digital communication systems, and thus research into methods of efficiently implementing operations in the finite field has been actively conducted. In particular, a finite field has recently been used as the basic element of S-box generation, ElGamal cryptosystems, elliptic curve cryptosystems, etc. for information protection technologies.

A finite field having $p^m$ elements for a prime number p and a positive integer m is represented by $GF(p^m)$, and there are several methods of configuring the finite field. It is well known that, when a polynomial f(z) defined in $GF(p) = \{0, 1, \ldots, p-1\}$ in which a degree is m and the coefficient of a highest-degree term is 1 is designated, $GF(p^m)$ is equivalent to $GF(p)[z]/\{f(z)\}$. By using such an equivalence relation, it may be considered that the finite field $GF(p^m)$ is a set of polynomials defined in GF(p), the degree of which is less than m. Here, $GF(p^m)$ is defined by a polynomial basis $GF(p) = \{1, z, \ldots, z^{m-1}\}$. In this case, two elements of $GF(p^m)$, that is, polynomials a(z) and b(z), may be respectively defined by the following Equations (1) and (2):

$$a(z) = \sum_{n=0}^{m-1} (a_n \cdot z^n) = a_{m-1} \cdot z^{m-1} + a_{m-2} \cdot z^{m-2} + L + a_1 \cdot z^1 + a_0 \cdot z^0 \quad (1)$$

$$b(z) = \sum_{n=0}^{m-1} (b_n \cdot z^n) = b_{m-1} \cdot z^{m-1} + b_{m-2} \cdot z^{m-2} + L + b_1 \cdot z^1 + b_0 \cdot z^0 \quad (2)$$

In Equations (1) and (2), $a_n, b_n \in GF(p)$ is satisfied for n=0, 1, ..., m-1. In the present invention, polynomial basis multiplication is expanded according to the polynomial defined in the following Equation (3), for scalar multiplication (finite field multiplication) of polynomials a(z) and b(z) in $GF(p^m)$ defined in a polynomial basis:

$$a(z) \cdot b(z) = \sum_{n=0}^{W-1} C_n \cdot z^n = C_{W-1} \cdot z^{W-1} + C_{W-2} \cdot z^{W-2} + L + C_1 \cdot z^1 + C_0 \cdot z^0 \quad (3)$$

where W denotes the number of bits of a word which is the operation processing unit of the 2n-bit processor (that is, the word size of the processor) for performing a multiplication operation in a binary extension finite field.

Figure 2:
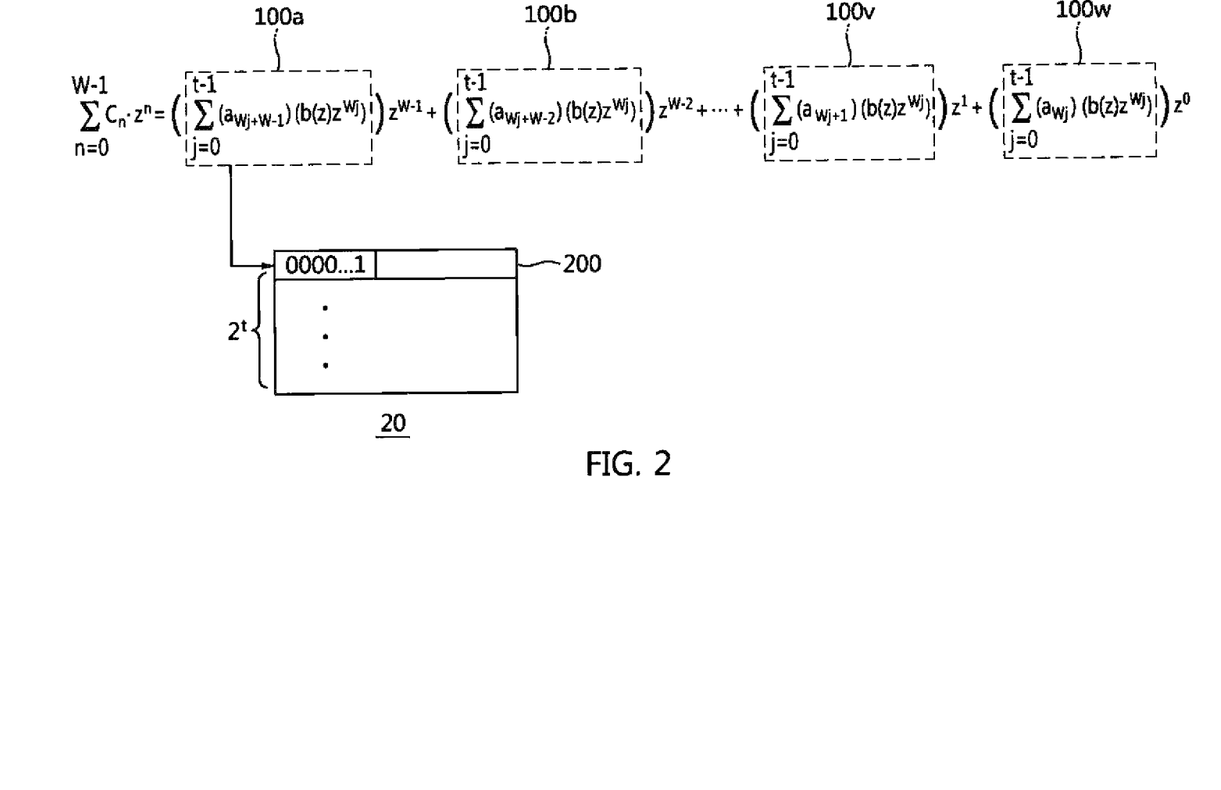
FIGS. 2 and 3 are diagrams showing a procedure for generating a mapping table in the flowchart of the method of performing a multiplication operation in a binary extension finite field according to the present invention shown in FIG. 1.
Figure 3:
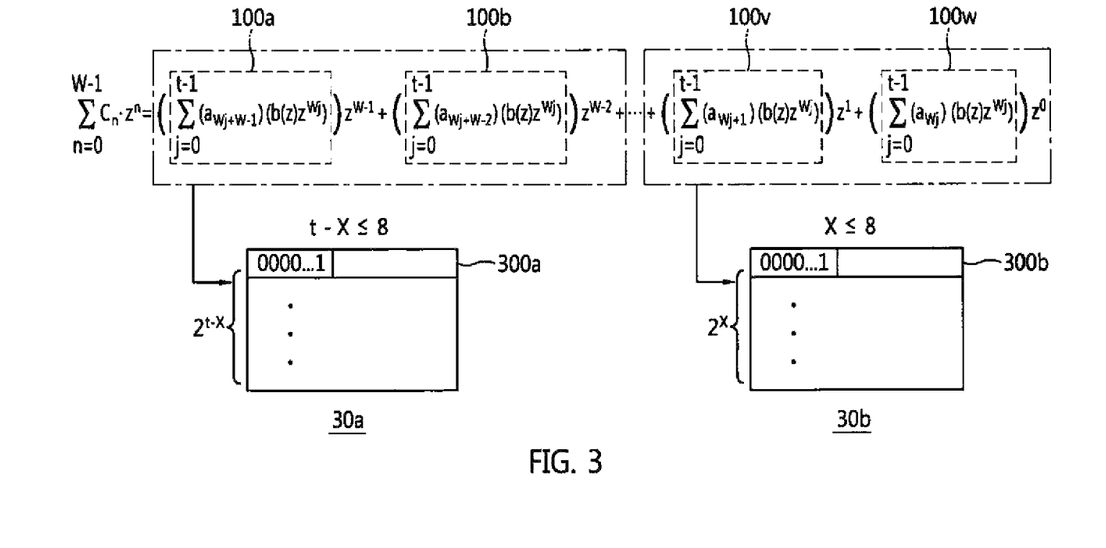

Hereinafter, the method of performing a multiplication operation in a binary extension finite field according to the present invention will be described in detail with reference to FIGS. 1 to 3.

Figure 1:
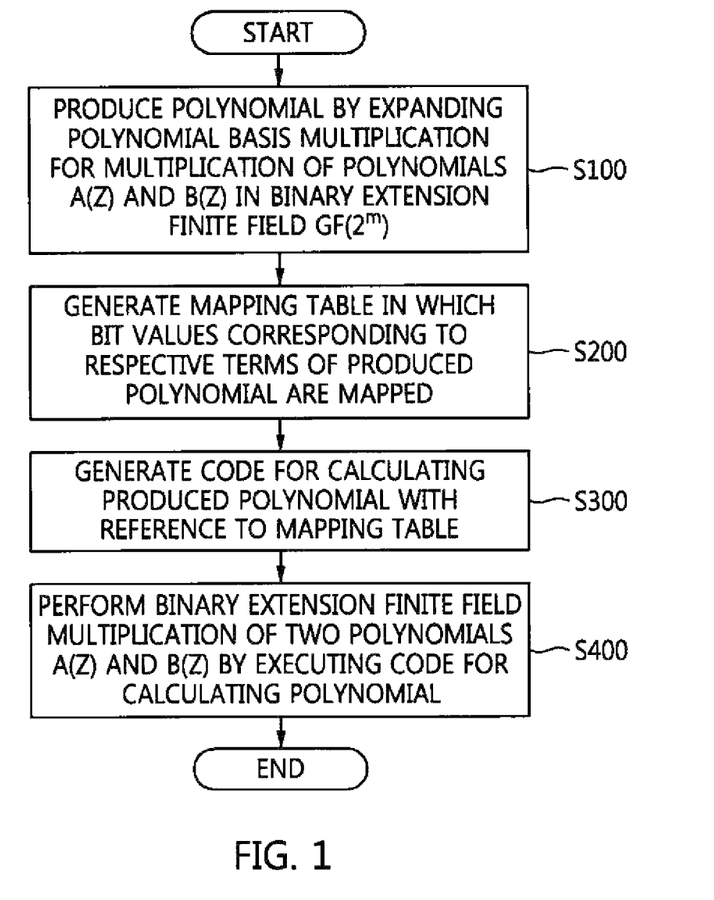
FIG. 1 is a flowchart showing a method of performing a multiplication operation in a binary extension finite field according to the present invention.

FIG. 1 is a flowchart showing a method of performing a multiplication operation in a binary extension finite field according to an embodiment of the present invention.

Referring to FIG. 1, in the method of performing a multiplication operation in a binary extension finite field according to the present invention, a polynomial defined by $$\sum_{n=0}^{W-1} C_n \cdot z^n$$

is produced by expanding polynomial basis multiplication for the multiplication $\{a(z) \cdot b(z)\}$ of two polynomials a(z) and b(z) in a binary extension finite field $GF(2^m)$ at step S100. In this case, the polynomial $$\sum_{n=0}^{W-1} C_n \cdot z^n$$

produced at step S100 is represented by the following Equation (4):

$$a(z) \cdot b(z) = \sum_{n=0}^{W-1} C_n \cdot z^n \quad (4)$$

$$= \left\{ \sum_{j=0}^{t-1} (a_{W \cdot j + W - 1})(b(z) \cdot z^{W \cdot j}) \right\} \cdot z^{W-1} +$$

$$\left\{ \sum_{j=0}^{t-1} (a_{W \cdot j + W - 2})(b(z) \cdot z^{W \cdot j}) \right\} \cdot z^{W-2} +$$

$$L + \left\{ \sum_{j=0}^{t-1} (a_{W \cdot j + 2})(b(z) \cdot z^{W \cdot j}) \right\} \cdot z^2 +$$

$$\left\{ \sum_{j=0}^{t-1} (a_{W \cdot j + 1})(b(z) \cdot z^{W \cdot j}) \right\} \cdot z^1 +$$

$$\left\{ \sum_{j=0}^{t-1} (a_{W \cdot j})(b(z) \cdot z^{W \cdot j}) \right\} \cdot z^0$$

where $$t = \left\lceil \frac{m}{W} \right\rceil,$$

and [x] denotes an operation for outputting a minimum integer equal to or greater than x. For example, when W=8 bits and m=160, t=20 is obtained, and when W=16 bits and m=160, t=10 is obtained. Further, in the binary extension finite field $GF(2^m)$, z=2 and $a_n, b_n \in \{0, 1\}$.

Then, a mapping table is generated in which bit values, having pieces of information about respective terms of the polynomial produced at step S100 by expanding the polynomial basis multiplication for the multiplication $\{a(z) \cdot b(z)\}$ of the polynomials a(z) and b(z), are mapped to respective rows at step S200. At step S200, a mapping table may be generated in which bit values having pieces of information about respective terms $$\left\{\sum_{j=0}^{t-1}(a_{W\cdot j+W-1})(b(z)\cdot z^{W\cdot j})\right\},$$

$$\left\{\sum_{j=0}^{t-1}(a_{W\cdot j+W-2})(b(z)\cdot z^{W\cdot j})\right\},$$

$$\ldots,$$

$$\left\{\sum_{j=0}^{t-1}(a_{W\cdot j+2})(b(z)\cdot z^{W\cdot j})\right\},$$

$$\left\{\sum_{j=0}^{t-1}(a_{W\cdot j+1})(b(z)\cdot z^{W\cdot j})\right\},$$

and $$\left\{\sum_{j=0}^{t-1}(a_{W\cdot j})(b(z)\cdot z^{W\cdot j})\right\}$$

in the polynomial $$\sum_{n=0}^{W-1} C_n \cdot z^n$$

are mapped to the respective rows. In this case, at step S200, as shown in FIG. 2, bit values having pieces of information about respective terms $$\left\{\sum_{j=0}^{t-1}(a_{W\cdot j+W-1})(b(z)\cdot z^{W\cdot j})\right\},$$

$$\left\{\sum_{j=0}^{t-1}(a_{W\cdot j+W-2})(b(z)\cdot z^{W\cdot j})\right\},$$

$$\ldots,$$

$$\left\{\sum_{j=0}^{t-1}(a_{W\cdot j+W-1})(b(z)\cdot z^{W\cdot j})\right\},$$

$$\left\{\sum_{j=0}^{t-1}(a_{W\cdot j+1})(b(z)\cdot z^{W\cdot j})\right\},$$

and $$\left\{\sum_{j=0}^{t-1}(a_{W\cdot j})(b(z)\cdot z^{W\cdot j})\right\}$$

corresponding to $C_n$ (100a, 100b, ..., 100v, 100w) in the polynomial $$\sum_{n=0}^{W-1} C_n \cdot z^n,$$

represented by Equation (4), may be mapped to and stored in the respective rows 200, ... of a mapping table 20 having $2^t$ rows. Further, the bit values mapped to and stored in the respective rows 200, ... of the mapping table 20 may correspond to bit values having pieces of information about $$\sum_{j=0}^{t-1}(a_{W\cdot j+W-1}), \sum_{j=0}^{t-1}(a_{W\cdot j+W-2}), \ldots, \sum_{j=0}^{t-1}(a_{W\cdot j+1}), \sum_{j=0}^{t-1}(a_{W\cdot j}),$$

respectively. For example, a bit value mapped to the first row 200 of the mapping table 20 in FIG. 2 is a bit value having information about $$\sum_{j=0}^{t-1}(a_{W\cdot j+W-1}),$$

and may correspond to $a_{W\cdot 1}a_{2W\cdot 1}L\ a_{W\cdot(t-1)-1}a_{W\cdot t-1}$. As the degree (m−1) of the polynomials a(z) and b(z) is higher, the value of $$t\left(=\left\lceil\frac{m}{W}\right\rceil\right)$$

increases, and then the number of rows ($2^t$) of the mapping table 20 generated at step S200 also increases. For example, at W=8 bits, when m=40, t=5, and then the mapping table 20 has $2^5$ rows. Further, when m=80, t=10, and then the mapping table 20 has $2^{10}$ rows. Furthermore, when m=160, t=20, and then the mapping table 20 has $2^{20}$ rows. The mapping table generated at step S200 may be stored in a storage means, such as a register provided in the processor for performing a multiplication operation in a binary extension finite field, or memory provided outside the processor.

Meanwhile, the number of rows of the mapping table 20 may preferably be $2^8$ (at t=8) which is the most suitable number upon implementing a software library. Accordingly, when t is greater than 8, a plurality of mapping tables, each having $2^8$ or less rows, are generated at step S200, and bit values having pieces of information about respective terms $$\left\{\sum_{j=0}^{t-1}(a_{W\cdot j+W-1})(b(z)\cdot z^{W\cdot j})\right\}, \left\{\sum_{j=0}^{t-1}(a_{W\cdot j+W-2})(b(z)\cdot z^{W\cdot j})\right\}, \ldots,$$

$$\left\{\sum_{j=0}^{t-1}(a_{W\cdot j+2})(b(z)\cdot z^{W\cdot j})\right\}, \left\{\sum_{j=0}^{t-1}(a_{W\cdot j+1})(b(z)\cdot z^{W\cdot j})\right\}, \text{and}$$

$$\left\{\sum_{j=0}^{t-1}(a_{W\cdot j})(b(z)\cdot z^{W\cdot j})\right\}$$

in the polynomial $$\sum_{n=0}^{W-1} C_n \cdot z^n$$

produced at step S100 may be mapped to the respective rows of the plurality of mapping tables. That is, as shown in FIG. 3, when t is greater than 8, a plurality of mapping tables 30a, 30b, ..., each having $2^8$ or less rows, are generated. With respect to some terms of the polynomial $$\sum_{n=0}^{W-1} C_n \cdot z^n$$

produced at step S100, bit values having pieces of information about the respective terms may be mapped to and stored in the respective rows 300a, . . . of the mapping table 30a having $2^8$ or less rows. With respect to the remaining terms of the polynomial, bit values having pieces of information about the remaining terms may be mapped to and stored in the respective rows 300b, . . . of another mapping table 30b having $2^8$ or less rows.

Next, with reference to the mapping table generated at step S200, a code for calculating the polynomial produced at step S100 is generated at step S300. That is, at step S300, a code for calculating the polynomial $$\left\{ \sum_{j=0}^{t-1} (a_{W\cdot j+W-1})(b(z) \cdot z^{W\cdot j}) \right\} \cdot z^{W-1} +$$

$$\left\{ \sum_{j=0}^{t-1} (a_{W\cdot j+W-2})(b(z) \cdot z^{W\cdot j}) \right\} \cdot z^{W-2} + L + \left\{ \sum_{j=0}^{t-1} (a_{W\cdot j+2})(b(z) \cdot z^{W\cdot j}) \right\} \cdot z^2 +$$

$$\left\{ \sum_{j=0}^{t-1} (a_{W\cdot j+1})(b(z) \cdot z^{W\cdot j}) \right\} \cdot z^1 + \left\{ \sum_{j=0}^{t-1} (a_{W\cdot j})(b(z) \cdot z^{W\cdot j}) \right\} \cdot z^0$$

produced by expanding the polynomial basis multiplication for the multiplication of the two polynomials a(z) and b(z) in the binary extension finite field $GF(2^m)$ is generated with reference to the mapping table 20 (30a, 30b, . . . ). In this case, if the code for calculating the multiplication of the polynomials a(z) and b(z) in the binary extension finite field is exemplarily represented by a pseudo-code with reference to the mapping table 20, the pseudo-code may be represented by a pseudo-code conforming to the algorithm shown in the following Table 2.

TABLE 2

Algorithm method for polynomial multiplication

INPUT: Binary polynomials a(z) and b(z) of degree at most m−1
OUTPUT: c(z) = a(z) · b(z), t = [m / W]
1. C ← 0
2. For k from 0 to W−1
   C ← Mapping_Table $[a_{k+(t-1)W}2^{t-1} + L\ a_{k+W}2^1 + a_k 2^0]$ + C
   C ← C · z
3. Return C Meanwhile, in the case where the plurality of mapping tables 30a and 30b, each having $2^8$ or less rows, are generated at step S200 as the value of t is greater than 8, if the code for calculating the multiplication of the polynomials a(z) and b(z) in the binary extension finite field is exemplarily represented by a pseudo-code with reference to the plurality of mapping tables 30a, 30b, . . . , the pseudo-code may be represented by a pseudo-code conforming to the algorithm shown in the following Table 3.

TABLE 3

Extended algorithm method for polynomial multiplication

INPUT: Binary polynomials a(z) and b(z) of degree at most m−1
OUTPUT: c(z) = a(z) · b(z), t = [m / W], X ≤ 8, t − X ≤ 8

TABLE 3-continued

Extended algorithm method for polynomial multiplication

1. C ← 0
2. For k from 0 to W−1
   C ← C + Mapping_Table $[a_{k+(X-1)W}2^{X-1} + L\ a_{k+W}2^1 + a_k 2^0]$
   C ← C + (Mapping_Table $[a_{k+(t-X-1)W}2^{t-X-1} + L\ a_{k+(X+1)W}2^1 + a_{k+XW}2^0]) \cdot z^X$
   C ← C·z
3. Return C Finally, in the method of performing a multiplication operation in a binary extension finite field according to the present invention, the binary extension finite field multiplication operation of the two polynomials a(z) and b(z) in the binary extension finite field $GF(2^m)$ is performed by executing the code for calculating the polynomial, generated at step S300, using the 2n-bit processor at step S400.

Meanwhile, the method of performing a multiplication operation in a binary extension finite field according to the present invention may be implemented in the form of program instructions that are executable by various types of computer means, and may be recorded in a computer-readable storage medium. The computer-readable storage medium may include program instructions, data files, and data structures either independently or in combination. The program instructions stored in the medium may be designed and configured especially for the present invention or may be known to and usable by those skilled in the art of computer software. Examples of the computer-readable storage medium may include a magnetic medium such as a hard disk, a floppy disk, or magnetic tape, an optical medium such as Compact Disk-Read Only Memory (CD-ROM) or a Digital Versatile Disk (DVD), a magneto-optical medium such as a floptical disk, and a hardware device such as ROM, Random Access Memory (RAM), or flash memory which is especially configured to store and execute program instructions. Examples of the program instructions include not only such machine language code as created by a compiler, but also such high-level language code as being executable by a computer using an interpreter or the like.

In accordance with the present invention, there is an advantage in that a multiplication operation optimized for the structure of a processor for performing a multiplication operation in a binary extension finite field $GF(2^m)$ can be performed regardless of the structure of the corresponding processor, when a multiplication operation in a binary extension finite field $GF(2^m)$ is implemented as a software library rather than hardware.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:
1. A method for optimizing a structure of a processor for performing a multiplication operation in a binary extension finite field, the optimization being performed by using algorithm, the method comprising:

producing a polynomial defined by $$\sum_{n=0}^{W-1} C_n \cdot z^n$$

by expanding polynomial basis multiplication for multiplication of two polynomials a(z) and b(z) in a binary extension finite field G F($2^m$);
  generating a mapping table in which bit values having pieces of information about respective terms of the produced polynomial are mapped to respective rows; and
  generating a code for calculating the polynomial, produced by expanding the polynomial basis multiplication for the multiplication of the two polynomials a(z) and b(z), with reference to the mapping table;
  wherein a multiplication operation of the two polynomials a(z) and b(z) in the binary extension finite field is calculated by a processor by executing the generated code for calculating the polynomial wherein $$a(z) = \sum_{n=0}^{m-1} a_n \cdot z^n, \; b(z) = \sum_{n=0}^{m-1} b_n \cdot z^n,$$

the W denotes a number of bits of a word that is an operation processing unit of the processor for performing the multiplication operation in the binary extension finite field,
  wherein the multiplication operation in the binary extension finite field is implemented by using the recited algorithm rather than hardware, regardless of a structure of the processor, and
  wherein producing the polynomial is configured to produce a polynomial $$\sum_{n=0}^{W-1} C_n \cdot z^n = \left\{\sum_{j=0}^{t-1} (a_{W\cdot j+W-1})(b(z)\cdot z^{W\cdot j})\right\} \cdot z^{W-1} + \\ \left\{\sum_{j=0}^{t-1} (a_{W\cdot j+W-2})(b(z)\cdot z^{W\cdot j})\right\} \cdot z^{W-2} + \ldots + \\ \left\{\sum_{j=0}^{t-1} (a_{W\cdot j+2})(b(z)\cdot z^{W\cdot j})\right\} \cdot z^{2} + \\ \left\{\sum_{j=0}^{t-1} (a_{W\cdot j+1})(b(z)\cdot z^{W\cdot j})\right\} \cdot z^{1} + \left\{\sum_{j=0}^{t-1} (a_{W\cdot j})(b(z)\cdot z^{W\cdot j})\right\} \cdot z^{0}$$

by expanding the polynomial basis multiplication given by the following equation $$a(z)\cdot b(z) = \\ \left\{\sum_{j=0}^{t-1} (a_{W\cdot j+W-1})(b(z)\cdot z^{W\cdot j})\right\} \cdot z^{W-1} + \left\{\sum_{j=0}^{t-1} (a_{W\cdot j+W-2})(b(z)\cdot z^{W\cdot j})\right\} \cdot z^{W-2} + \\ \ldots + \left\{\sum_{j=0}^{t-1} (a_{W\cdot j+2})(b(z)\cdot z^{W\cdot j})\right\} \cdot z^{2} +$$

$$\left\{\sum_{j=0}^{t-1} (a_{W\cdot j+1})(b(z)\cdot z^{W\cdot j})\right\} \cdot z^{1} + \left\{\sum_{j=0}^{t-1} (a_{W\cdot j})(b(z)\cdot z^{W\cdot j})\right\} \cdot z^{0}$$

for the multiplication of the two polynomials a(z) and b(z) wherein $$t = \left\lceil \frac{m}{W} \right\rceil,$$

and [x] denotes an operation for outputting a minimum integer equal to or greater than x.

2. The method of claim 1, wherein generating the mapping table is configured to generate a mapping table in which bit values having pieces of information about respective terms $$\left\{\sum_{j=0}^{t-1} (a_{W\cdot j+W-1})(b(z)\cdot z^{W\cdot j})\right\}, \left\{\sum_{j=0}^{t-1} (a_{W\cdot j+W-2})(b(z)\cdot z^{W\cdot j})\right\}, \ldots ,$$

$$\left\{\sum_{j=0}^{t-1} (a_{W\cdot j+2})(b(z)\cdot z^{W\cdot j})\right\}, \left\{\sum_{j=0}^{t-1} (a_{W\cdot j+1})(b(z)\cdot z^{W\cdot j})\right\}, \text{ and}$$

$$\left\{\sum_{j=0}^{t-1} (a_{W\cdot j})(b(z)\cdot z^{W\cdot j})\right\}$$

in the polynomial are mapped to respective rows.

3. The method of claim 2, wherein generating the mapping table is configured to map the bit values having the pieces of information about the respective terms $$\left\{\sum_{j=0}^{t-1} (a_{W\cdot j+W-1})(b(z)\cdot z^{W\cdot j})\right\}, \left\{\sum_{j=0}^{t-1} (a_{W\cdot j+W-2})(b(z)\cdot z^{W\cdot j})\right\}, \ldots ,$$

$$\left\{\sum_{j=0}^{t-1} (a_{W\cdot j+2})(b(z)\cdot z^{W\cdot j})\right\}, \left\{\sum_{j=0}^{t-1} (a_{W\cdot j+1})(b(z)\cdot z^{W\cdot j})\right\}, \text{ and}$$

$$\left\{\sum_{j=0}^{t-1} (a_{W\cdot j})(b(z)\cdot z^{W\cdot j})\right\}$$

in the polynomial to respective rows of a mapping table having $2^t$ rows.

4. The method of claim 2, wherein generating the mapping table is configured to, if a value of t is greater than a preset integer r, map the bit values having the pieces of information about the respective terms $$\left\{\sum_{j=0}^{t-1} (a_{W\cdot j+W-1})(b(z)\cdot z^{W\cdot j})\right\}, \left\{\sum_{j=0}^{t-1} (a_{W\cdot j+W-2})(b(z)\cdot z^{W\cdot j})\right\}, \ldots ,$$

$$\left\{\sum_{j=0}^{t-1} (a_{W\cdot j+2})(b(z)\cdot z^{W\cdot j})\right\}, \left\{\sum_{j=0}^{t-1} (a_{W\cdot j+1})(b(z)\cdot z^{W\cdot j})\right\}, \text{ and}$$

$$\left\{\sum_{j=0}^{t-1} (a_{W\cdot j})(b(z)\cdot z^{W\cdot j})\right\}$$

in the polynomial to respective rows of a plurality of mapping tables, each having $2^r$ or less rows.

5. The method of claim 4, wherein the preset integer r is 8.

* * * * *